United States Patent [19]

Winter

[11] 4,404,708
[45] Sep. 20, 1983

[54] HANDLE
[75] Inventor: Albert J. Winter, Vereeniging, South Africa
[73] Assignee: Modern Inventions (Proprietary) Limited, Johannesburg, South Africa
[21] Appl. No.: 374,422
[22] Filed: May 3, 1982

Related U.S. Application Data

[63] Continuation of Ser. No. 59,232, Jul. 20, 1979.

[30] Foreign Application Priority Data

Aug. 7, 1978 [ZA] South Africa .................. 78/4458

[51] Int. Cl.³ .................. A47B 95/02; A47I 45/00; B65D 25/28; E05B 1/00
[52] U.S. Cl. .................. 16/110 R; 145/29 R; 403/263
[58] Field of Search ............. 403/263, 368; 16/110 R; 145/29 R, 36; 273/80.6

[56] References Cited

U.S. PATENT DOCUMENTS

| 1,194,170 | 7/1916 | Grossmann | 145/61 R |
|---|---|---|---|
| 1,707,787 | 4/1929 | Estwing | 145/61 K |
| 2,467,284 | 4/1946 | Williams | 16/110 R |
| 2,837,381 | 6/1958 | Sarlandt | 403/263 |
| 2,884,969 | 5/1959 | Lay | 145/29 R |
| 2,983,296 | 5/1961 | Lay | 145/29 R |
| 3,175,232 | 3/1965 | Stowell | 403/368 X |
| 3,877,826 | 4/1975 | Shepherd | 403/267 |
| 3,879,145 | 4/1975 | Carmien | 403/268 |
| 4,144,919 | 3/1979 | Miller | 145/29 R |
| 4,291,998 | 9/1981 | Santos | 16/110 R |
| 4,331,193 | 5/1982 | Tudisco | 145/29 R |
| 4,334,563 | 1/1982 | Ebel et al. | 145/29 R |

FOREIGN PATENT DOCUMENTS

| 70/1550 | 10/1971 | South Africa . |
| 75/3167 | 4/1976 | South Africa . |
| 75/4246 | 1/1977 | South Africa . |

Primary Examiner—Wayne L. Shedd

[57] ABSTRACT

A handle for a hammer or the like striking tool comprises a body of elastomeric material having embedded therein a core made up of a pair of laterally spaced, flat bars of spring steel. Ends of the bars protrude from one end of the body. The handle is fastened to a hammer head by having the protruding end portions of the bars accommodated in a bore in the hammer head and by wedging them apart. The otherwise unoccupied space of the bore is filled with an epoxy resin. The bars are arranged with their planes lying parallel to the plane in which the hammer is swung in use.

18 Claims, 7 Drawing Figures

HANDLE

This is a continuation of application Ser. No. 059,232, filed July 20, 1979.

BACKGROUND TO THE INVENTION

This invention relates to a handle for a striking tool such as a hammer, axe, pick, or the like, having a striking head with a passage transversely therethrough in which passage an end of the handle is accommodated. Such a handle is herein, for the sake of brevity, simply referred to as a handle of the kind described. The invention also relates to a striking tool including such handle.

Handles of the kind described have for a long time been of wood. Indeed, wooden handles are still being used at the present time. Such a wooden handle is usually fixed to the striking head by having one of the ends of the handle accommodated in the passage in the striking head and by having a wedge driven into that end of the handle. The wedge causes lateral expansion of the end of the handle and, as the passage generally increases in cross sectional area towards that end of the handle, this will tightly secure and lock the handle in position relative to the head.

There has, however, been a move away from wooden handles towards handles of materials which are not as prone to splitting or breaking as is wood, and which have more uniform and predictable properties than wood. Thus, the applicant is aware of a handle which has an elongate body of elastomeric material and a core of flexible steel rods or wires embedded in and extending longitudinally through the body. Such a combination of an elastomeric body with a steel core has been found to have decided advantages over the ordinary wooden handle. However, it has always been difficult to secure such a handle to a hammer head. In one hammer known to the applicant, recourse was had to passing the rods or wires into the passage and through a metal plate and providing the ends of the rods or wires by deformation with button formations to prevent their withdrawal from the plate. The plate was then welded to the hammer head. In another hammer known to the applicant the rods or wires were bent back on themselves, around a pin passing transversely through the hammer head and crossing the bore in the head. In both these hammers the rods or wires are thus secured to the hammer head prior to embedding the rods or wires in the elastomeric material. When the elastomeric material is subsequently moulded around the rods or wires, the material is also caused to enter the unoccupied space of the passage so as to become bonded not only to the rods or wires but also to the walls of the passage. The handles of these hammers are therefore permanent fixtures to the heads of the hammers and fixing of the handles to the hammer heads has to be carried out by the manufacturer. In other words the user has to buy complete hammers from the manufacturer and cannot buy only the handles and fit these himself to heads of his own choice.

Another problem with the above hammers having handles of steel and elastomeric material is that the handle is flexible in all longitudinally extending planes and has relatively low tortional stability with respect to the longitudinal direction of the handle. Applicant has found that it is undesirable to have the handle flexible in the plane in which it is swung in use. In other words, the applicant has found it to be undesirable for the handle to be able to bend about an axis normal to the plane in which it is swung in use. The resiliency of the elastomeric material has been found to be sufficient to absorb shocks when a blow is struck. However, it may be desirable to have the handle resiliently flexible in the longitudinal plane transverse to the plane in which the handle is swung during use. This is so because, as the head is usually elongate in the plane in which the tool is swung during use, the tool will, if it is left lying on the ground, take up a position in which the plane in which it is swung during use is substantially parallel to the plane of the ground. As the head has a certain thickness between its sides and the walls of the passage, the end of the handle near the head will be raised off the ground slightly. If the handle is not resiliently flexible in such plane, it will either break or be deformed permanently should a heavy downward load be applied to it, such as by a heavy truck riding over it.

It is an object of the invention to overcome or at least mitigate the above difficulties.

SUMMARY OF THE INVENTION

According to the invention there is provided a handle of the kind described, which comprises an elongate body of elastomeric material, and a core embedded in and extending substantially throughout the length of the body, the core having a pair of end portions protruding from one end of the body for insertion into the passage of a striking head, the end portions being capable of being wedged apart so as to facilitate fastening of the handle to the striking head.

At least that portion of the core which is embedded in the body may be substantially inflexible in a first longitudinally extending plane, and resiliently flexible in a second longitudinally extending plane transverse to said first longitudinally extending plane. In other words, the core may be such as to resist bending about an axis normal to said first longitudinally extending plane, and permit resiliently flexible bending about an axis normal to said second longitudinally extending plane.

Thus, the core may comprise a pair of longitudinally extending spring steel bars, each being substantially wider than it is thick, the bars being arranged adjacent one another in planes parallel to said first longitudinally extending plane, and said protruding end portions of the core each being formed by a protruding end of a respective bar.

The bars may be of uniform rectangular cross section throughout their length, each having a width of at least about five times its thickness. This is convenient in that use may then be made of readily available stock which is cut to desired length. Each bar preferably has a width of about eight times it thickness.

The bars may be interconnected in the body by a plurality of longitudinally spaced fasteners, each extending from one bar to the other and passing at each opposite end thereof through a bore through the thickness of the respective bar. The fasteners may be rivets.

The bars may be spaced apart. They may be spaced apart by a distance of about half their width, the spacing being measured from their central planes. Each fastener may pass through an annular spacer or bush interposed between the bars, the bars abutting against opposite ends of the spacer.

Said one end of the body may be provided with a metal plate having a pair of holes therein through which the bars pass. The plate may be of steel.

The body may be wider as measured in said first longitudinally extending plane, than it is thick, as measured in said second longitudinally extending plane.

The body may be of vulcanized rubber and may be bonded to the core. To facilitate bonding of the rubber to the bars, the bars may have a roughened external surface.

The invention further extends to a striking tool which comprises a striking head having a passage transversely therethrough, and a handle in accordance with the invention as hereinbefore described, the handle being fastened to the striking head by being accommodated in the passage at said one end and by having the protruding end portions of the core wedged apart. The handle may be arranged such that said second longitudinally extending plane is parallel to the plane in which the striking tool is to be swung in use.

The otherwise unoccupied space of the passage in the striking head may be filled with epoxy resin.

The passage may have a zone of minimum cross sectional area and increase in cross sectional area in a direction opposite to that in which the handle extends from the striking head.

BRIEF DESCRIPTION OF THE DRAWINGS

The invention will now be described in more detail, by way of example, with reference to the accompanying drawings.

In the drawings.

DETAILED DESCRIPTION OF PREFERRED EMBODIMENTS

Figure 1:
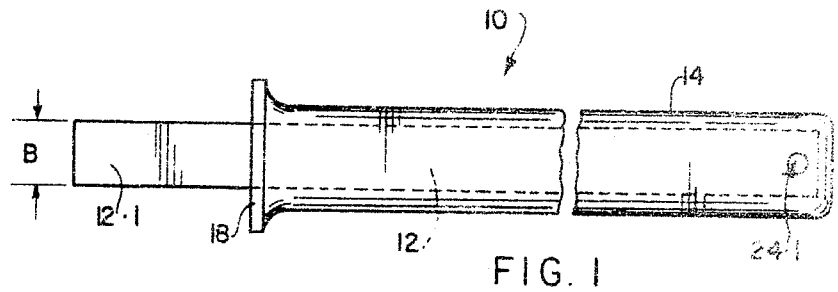
FIG. 1 is a broken side view of a hammer handle in accordance with the invention.

Referring now to the drawings, reference numeral 10 generally indicates a hammer handle having a core constituted by a pair of flat spring steel bars 12. The bars 12 are of EN42F steel, and have a thickness A of about 3 mm and a width B of about 25 mm. The bars are heat-treated to have a hardness of between 35 and 45 on the Rockwell C scale. The bars 12 are embedded in a rubber moulding 14 which constitutes the body of the handle.

Figure 4:
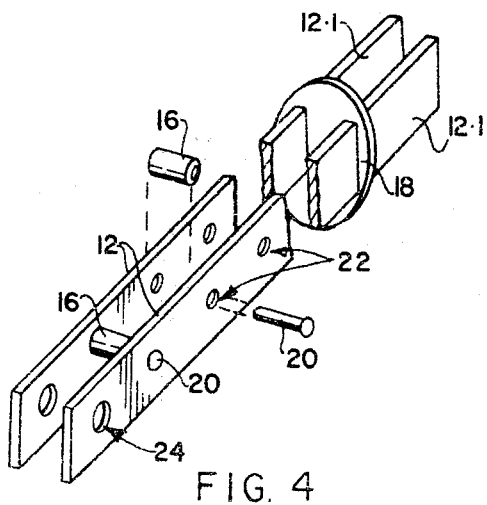
FIG. 4 shows a broken perspective, partly exploded view of the core of the handle, showing its assembly.

In manufacturing the handle, the two bars 12 are first assembled as shown in FIG. 4. This is done by spacing the two bars apart by means of a series of spacer bushes 16 and slipping a steel plate 18 over the bars at one end. The steel plate 18 has for this purpose two rectangular holes 18.1 which correspond in cross section to the cross-section of the bars. The bars are also attached together by rivets 20 which pass through holes 22 spaced along the length of the bars 12, and through the spacer bushes 16. At the end remote from the plate 18, the bars are provided with holes 24 which are slightly larger than the holes 22. In the assembled form, the bars 12 are spaced apart by a distance C which is about half their width B.

The core assembly is then placed in an injection mould and is supported in the mould by the plate 18 and/or end portions 12.1 of the bars 12 which protrude from the plate 18, and by a supporting member (not shown) which extends through the holes 24. Thereupon a mouldable rubber material is injected into the mould and allowed to set. The finished handle is then taken out of the mould. The supporting part of the mould which was located in the holes 24 will leave the hammer handle with a hole 24.1 which can be used to suspend the handle or to attach a safety cord thereto.

Figure 5:
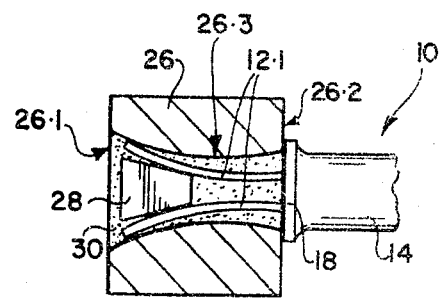
FIG. 5 is a top plan view of part of the handle showing its connection to a sledge hammer head, the head being shown in cross-section.

Referring now to FIG. 5, in securing the handle 10 to a sledge hammer head 26 which has a passage 26.1 transversely therethrough, the protruding end portions 12.1 of the bars 12 are inserted into the passage 26.1, until the plate 18 abuts against the end face 26.2 of the hammer head. Thereafter a wedge 28 is driven between the two end portions 12.1 causing them to bend apart. Thereafter an epoxy resin 30 is poured into the passage 26.1 and allowed to set.

Figure 2:
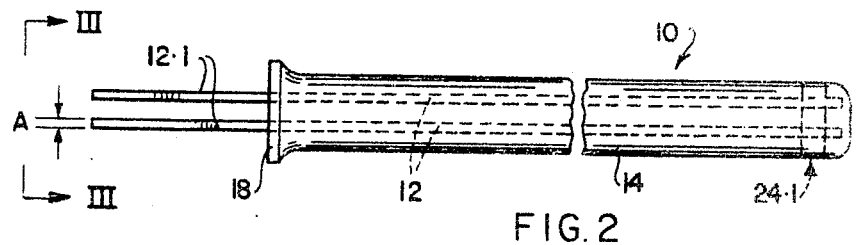
FIG. 2 is a broken top plan view of the handle.
Figure 3:
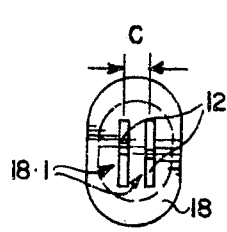
FIG. 3 is an end view of the handle as seen from III—III in FIG. 2.

It will be seen that the hammer will in use be swung in a plane parallel to the plane of the bars 12, ie in the plane of the paper when referring to FIG. 1 and in a plane transverse to the plane of the paper when referring to FIGS. 2 and 5. Because of the relatively large width B of the bars 12, the handle 10 will be substantially rigid in the plane in which it is to be swung in use. However, in the longitudinally extending plane transverse to the plane in which the handle will be swung in use, the handle will be resiliently flexible.

Figure 6:
FIGS. 6 and 7 show some alternative cross-sectional shapes which the bars of the core may have.

Referring now to FIG. 6, there is shown a pair of bars 32 which can be used in place of the bars 12 and which differ from the bars 12 in that they are slightly waisted in cross-section.

Figure 7:

In FIG. 7 there is shown a pair of bars 34 which can also be used in place of the bars 12 and which differ from the bars 12 in that they are slightly curved about a longitudinal axis.

The use of flat bars instead of bars which are round in cross-section, provides the added advantage that flat bars have a relatively large surface area in relation to the steel cross-section. The applicant believes that this will improve the bonding between the body 14 and the bars 12. The applicant also believes that the flat bars will give the handle a higher torsional stability about the longitudinal direction of the handle than would be obtainable with round rods of comparable cross sectional area. By torsional stability is meant the degree by which the handle will resist twisting about the longitudinal direction.

It will be seen in FIG. 5 that the bore 26.1 has a zone of minimum cross sectional area 26.3 and increases in cross sectional area towards the free ends of the end portions 12.1.

What I claim is:

1. A handle of the kind described, which comprises an elongate body of elastomeric material, the body having opposite ends beyond which the elastomeric material does not extend, and a reinforcing core embedded in and extending substantially throughout the length of the body, the core having a pair of end portions protruding beyond one of said ends of the body for inserting into the passage of a striking head, the end portions being capable of being wedged apart so as to facilitate fastening of the handle to the striking head.

2. A handle of the kind described, which comprises an elongate body of elastomeric material, the body having opposite ends beyond which the elastomeric material does not extend, and a reinforcing core embedded in and extending substantially throughout the length of the body, the core comprising a pair of juxtaposed, longitudinally extending, resiliently flexible bars, each being substantially wider than it is thick and having their widths extending in spaced parallel planes, and the core having a pair of end portions protruding beyond one of said ends of the body for insertion into the passage of a striking head, the end portions each being formed by a protruding end of a respective bar and being capable of being wedged apart so as to facilitate fastening of the handle to the striking head.

3. A handle as claimed in claim 2, wherein the bars are of uniform rectangular cross section throughout their length, each having a width of at least about five times its thickness.

4. A handle as claimed in claim 3, wherein each bar has a width of about eight times its thickness.

5. A handle as claimed in claim 2, wherein the bars are interconnected in the body by a plurality of longitudinally spaced fasteners, each extending from one bar to the other and passing at each opposite end thereof through a bore through the thickness of the respective bar.

6. A handle as claimed in claim 5, wherein the fasteners are rivets.

7. A handle as claimed in claim 2, wherein the bars are spaced apart.

8. A handle as claimed in claim 7, wherein the bars are spaced apart by a distance of about half their width.

9. A handle as claimed in claim 5, wherein the bars are spaced apart and wherein each fastener passes through an annular spacer interposed between the bars.

10. A handle as claimed in claim 2, wherein said one end of the body is provided with a metal plate having a pair of holes therein through which the bars pass.

11. A handle as claimed in claim 2, wherein the body is wider as measured in the direction of the width of the bars, than it is thick, as measured in the direction of the thickness of the bars.

12. A handle as claimed in claim 1, wherein the body is of vulcanized rubber and is bonded to the core.

13. A striking tool which comprises a striking head having a passage transversely therethrough, and a handle as claimed in claim 1, the handle being fastened to the striking head by being accommodated in the passage at said one end and by having the protruding end portions of the core wedged apart.

14. A striking tool, which comprises a striking head having a passage transversely therethrough, and a handle as claimed in claim 3, the handle being fastened to the striking head by being accommodated in the passage at said one end and by having the end portions of the core wedged apart, and the handle being arranged such that the width of each bar extends parallel to the plane in which the striking tool is to be swung in use.

15. A striking tool as claimed in claim 13, wherein the otherwise unoccupied space of the passage in the striking head is filled with epoxy resin.

16. A striking tool as claimed in claim 13, wherein the passage has a zone of minimum cross sectional area and increases in cross sectional area in a direction away from that in which the handle extends from the striking head.

17. A handle as claimed in claim 1 or claim 3, wherein the bars are of steel.

18. A handle as claimed in claim 3, wherein the bars are of spring steel.

* * * * *